Figure 1:
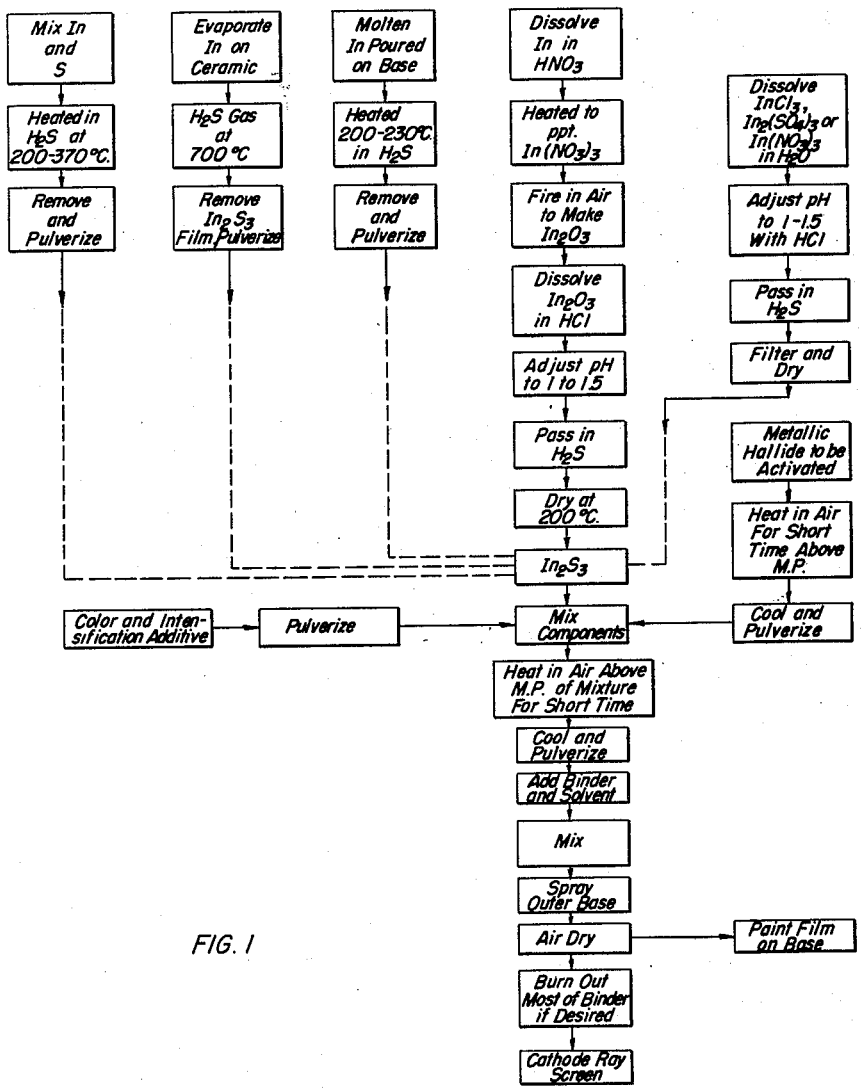

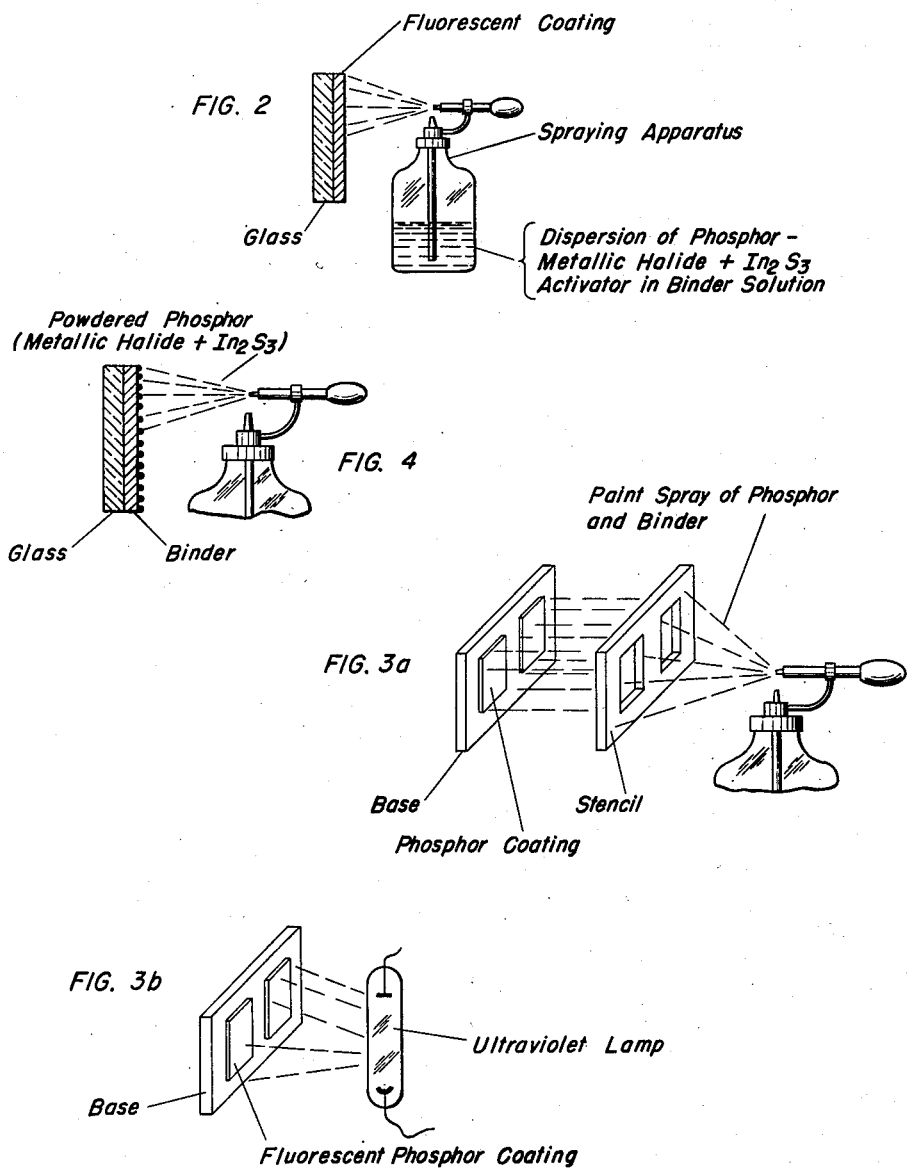

April 20, 1954

D. C. REYNOLDS ET AL 2,676,111

PHOSPHOR COMPOSITION CONTAINING INDIUM
AND METHOD OF PRODUCING SAME

Filed Aug. 18, 1951

5 Sheets-Sheet 3

INVENTORS.
Donald C. Reynolds
Arthur E. Middleton
Charles S. Peet

BY Adams, Stevens and Mose
AGENTS.

INVENTORS.
Donald C. Reynolds
Arthur E. Middleton
Charles S. Peet

BY Adams, Stevens and Mass
AGENTS.

Grams $CdCl_2$, Mixed With 1g $In_2S_3$ and 0.1% Cu
(As CuS) Color Additive

INVENTORS.
Donald C. Reynolds
Arthur E. Middleton
Charles S. Peet

BY Adams, Stevens and Mose
AGENTS.

Patented Apr. 20, 1954

2,676,111

UNITED STATES PATENT OFFICE 2,676,111

PHOSPHOR COMPOSITION CONTAINING INDIUM AND METHOD OF PRODUCING SAME

Donald C. Reynolds, Arthur E. Middleton, and Charles S. Peet, Columbus, Ohio, assignors, by mesne assignments, to The Consolidated Mining and Smelting Company of Canada, Limited, Trail, British Columbia, Canada, a corporation of British Columbia, Canada Application August 18, 1951, Serial No. 242,563

16 Claims. (Cl. 117—33.5)

The present invention relates to new and novel phosphors and, more particularly, to phosphors containing indium. Specifically, this invention relates to materials which are made into phosphors or rendered fluorescent by the introduction of an indium compound and which also may contain a coloring agent, to compositions containing such phosphors and characterized by their ability to be readily applied to base materials, to a method or process of making such phosphors and compositions, to articles containing such phosphors and compositions and to a method or process of making these articles.

Phosphors have found many uses in industry in recent years and notable among these are where phosphors have been used in cathode ray tubes such as radarscopes and television tubes. Phosphors have also been employed to make fluorescent paints for use in screens and signs. Scintillation counters provide other media for the use of phosphors. With the advent of television the demand for phosphors which will respond to electron bombardment as well as other radiation and emit colored light or be fluorescent in certain color ranges of the spectrum has greatly increased, and, therefore, it is an important object of the present invention to afford a new and novel phosphor, which will respond to the usual exciting means including electron bombardment and will be fluorescent in certain color ranges of the spectrum, thereby increasing the availability and use of phosphors particularly in color television. Although many compounds including indium itself and its compounds are not themselves fluorescent, a way has now been found to activate or make phosphors of such compounds, with indium or an indium compound, which fluoresces and emits certain colors, and it is, therefore, another object of this invention to provide a phosphor containing an indium compound.

It is yet another object of this invention to provide a method of making a phosphor containing an indium compound.

It is still another object of this invention to provide a new and novel phosphor composition suitable for dipping, dusting, roller-coating, and spraying, on a basis material to make a coating or screen which will be fluorescent when radiated.

It is a further object of this invention to provide a method of applying said phosphor to a base material.

It is a still further object of this invention to provide an article having a coating of said phosphor containing an indium compound and/or phosphor composition containing an indium compound.

It is again an object of this invention to provide a method of making articles having a coating of the phosphor or phosphor composition of the present invention.

It is yet again an object of this invention to provide phosphors or phosphor compositions containing an indium compound so as to activate them or render them fluorescent when radiated as well as a coloring and/or intensification agent which will cause them to emit colored light and/or more intense light.

Figure 5:
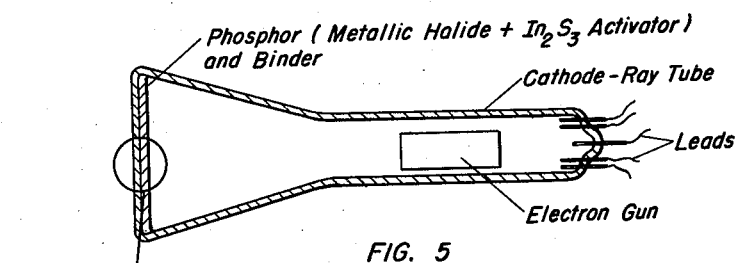
Figure 6A:
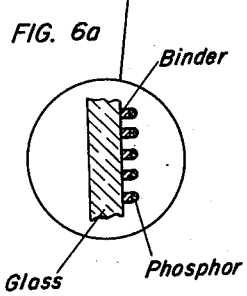
Figure 6B:
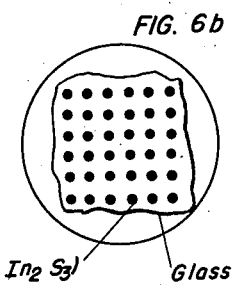
Figure 7:
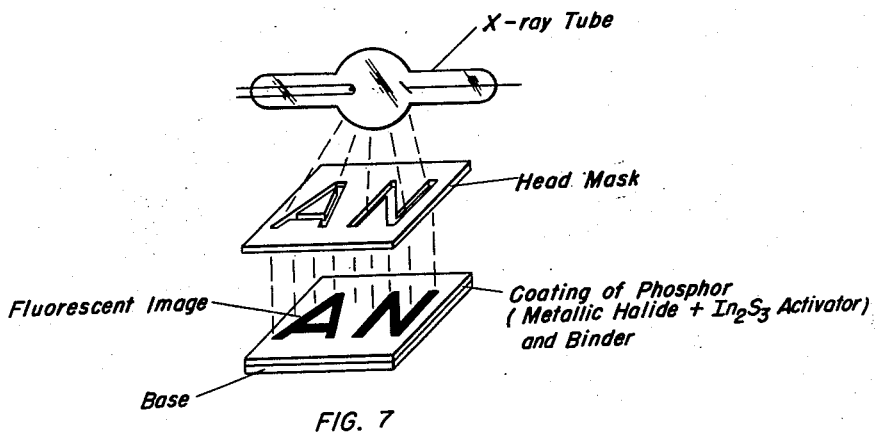
Figure 8:
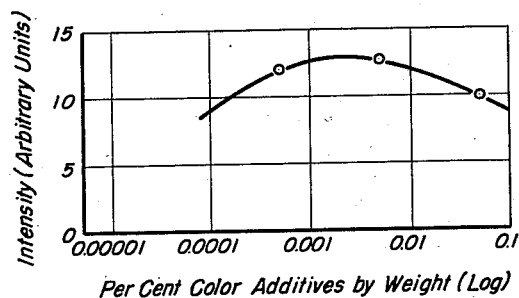
Figure 9:
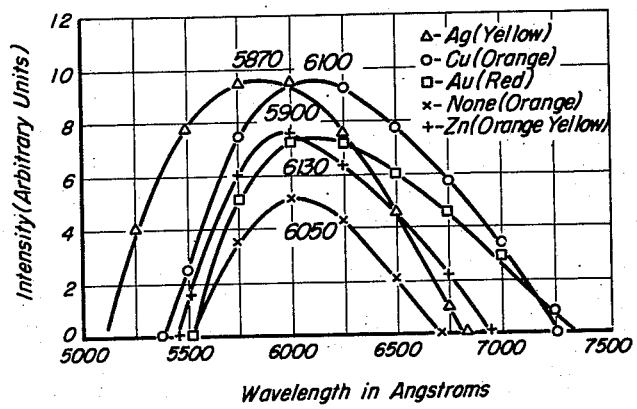
Figure 10:
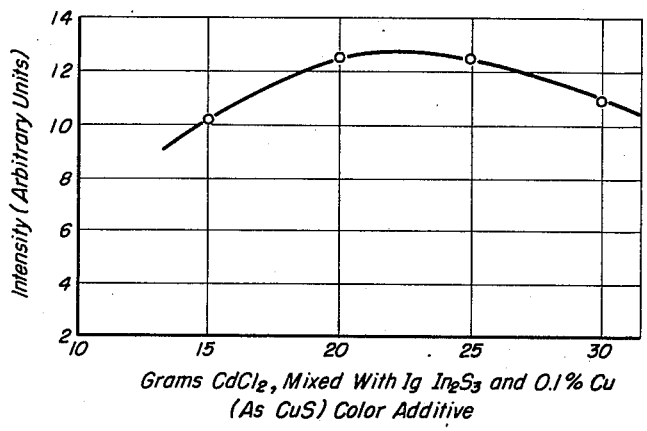
Figure 11A:
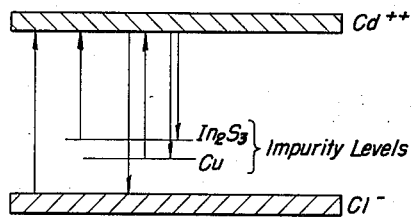
Figure 11B:
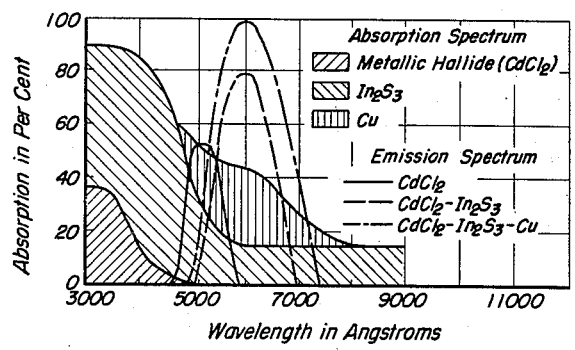

These and other objects and advantages of the present invention will become more apparent to those skilled in the art, from the following detailed description, examples and drawing, wherein:

Fig. 1 is a flow sheet of the method of preparing the phosphor and phosphor composition containing an indium compound of this invention, and Fig. 2 illustrates a method of coating a base material with the phosphor composition disclosed herein, and Fig. 3a and b shows a method of spray painting the phosphor followed by excitation thereof, and Fig. 4 illustrates a method of applying the phosphor compound of this invention directly to a base material containing an adhesive layer, and Fig. 5 discloses a cathode ray tube containing the indium phosphor of this invention, and Fig. 6a and b is an enlarged vertical sectional and side elevational view of a portion of the device shown in Fig. 5, and Fig. 7 shows a method of utilizing the new and novel phopshor disclosed herein to produce images, and Fig. 8 shows the variation in intensity of a phosphor of this invention using various amounts of a particular color additive, and Fig. 9 shows the spectral distributions of phosphors of this invention with various color additives, and Fig. 10 shows variation in intensity of a phosphor of this invention when activator and base are varied and color additive kept constant, and Fig. 11a and b is an energy level diagram of the phosphor of this invention.

It has now been found that a new and novel phosphor can be obtained by activating a metallic halide matrix with indium sulfide. It has been found that it is only necessary to melt the components in air for a relatively short time to effect the desired results. When excited by the X-ray, ultraviolet ray and other radiation, this material will fluoresce. By introducing certain additives in the indium sulfide activated matrix a variety of different colored light and increased intensity of emission may be obtained under such radiation.

It is not precisely known why a metallic halide containing a minor amount of indium sulfide becomes fluorescent under radiation since none of the materials, per se, that is indium sulfide, the metallic halide, and the color additive, from which the phosphor compound is made, are themselves considered to be fluorescent. However, it is believed that by the process disclosed herein the indium sulfide is caused to enter or is fused within the crystal lattice of the metallic halide molecule to provide a fluorescent center which can readily be energized by a source of energy to result in the activation of the metallic halide molecule, thereby causing it to fluoresce. In such a case, it is believed that the indium sulfide should be considered as an activator. It might also be thought of as a foreign impurity atom or molecule providing impurity centers in the metallic halide molecule to result in fluorescence under radiation. It is not necessary to add a large amount of indium sulfide to the metallic halide molecule; only a sufficient amount need be added to the halide or be present in the halide crystal lattice to provide the necessary fluorescent centers.

In the case of the color additive or intensifier only a minor amount is needed to provide the desired color and intensity. It is not precisely known how the color intensifier operates although it is believed that it likewise enters the crystal lattice of the metallic halide and due to emission from the indium sulfide alone or in combination with the metallic halide causes the color and intensity to change.

In general, as is readily seen from the flow sheet, Fig. 1, indium sulfide can be prepared in a number of ways and added to the metallic halide and color additive. The mixture is then heated to a temperature and for a period of time sufficient to cause the metallic halide salt base or matrix to melt, permitting the indium sulfide, and the color additive when used, to enter its crystal lattice and thus form, on cooling and solidifying, a complex crystal of metallic halide base, indium sulfide and color and intensification additive. The resulting fired, solid or fused, phosphor, after being powdered or reduced to a fine state, can be used directly as a fluorescent material by sprinkling it on a base plate and subjecting the powder layer to radiation. However, it is much more advantageous and practical to disperse it in a sufficient amount of an adhesive binder and spray it onto the base as shown in Fig. 2. Fig. 3a and b shows the use of the indium phosphor of this invention to form a painted design which will fluoresce under excitation from an ultraviolet light. The dry powdered phosphor can also be sprayed as a dry material on to a backing coated with an adhesive or binder as disclosed in Fig. 4. The new and novel composition of this invention applied to a cathode ray or television tube is shown in Fig. 5. Fig. 6a and b is an enlarged portion of the television tube screen showing the phosphor on the inner face of the tube as a plurality of tiny particles held thereon by a minor portion of the adhesive, the bulk or remainder of the adhesive having been burned off to decrease the opacity of the tube and to leave essentially only the fluorescent particles thereon. In Fig. 7 there is shown a base having a coating of the present phosphor which is caused to exhibit a fluorescent pattern when excited by radiation from an X-ray source through a mask or stencil. Fig. 8 shows how a minor amount of color additive, CuS, can change the intensity of a phosphor of the present invention. In Fig. 9 there is shown the change in color and intensity which may be achieved with different color activators such as Ag, Au, Cu, and Zn. Fig. 10 discloses how the intensity of the fluorescence of the phosphor can readily be changed within certain limits by varying the amount of the base material $CdCl_2$, with respect to the activator, $In_2S_3$, and color additive, CuS. Fig. 11a and b shows an energy level diagram or picture of the colored indium sulfide-metallic halide phosphor of this invention, which has orange fluorescent centers, showing the possible electronic transitions in the material. It is readily seen from the foregoing that many new and novel phosphors can be prepared utilizing indium sulfide with varying degrees of intensity, and, moreover, the addition of very minor amounts of a color and intensification additive can be used when desirable to further enhance the properties of the indium activated phosphor of this invention.

The base material or matrix should be one which is capable of being activated by the addition of indium sulfide and will when excited thereby fluoresce. It has been found that a metallic halide such as barium bromide, barium chloride, cadmium bromide, cadmium chloride, potassium bromide, potassium chloride, sodium bromide, sodium chloride, strontium bromide, and strontium chloride will readily be activated by indium sulfide and thus fluoresce under radiation. Such activated or base material matrix forms the bulk, major, or predominating amount of the phosphor. The other halides of these metals can also be used although they are less desirable since they are expensive to use and at elevated temperatures they are apt to decompose, sublime, or react violently and, consequently, are not so practical. However, with special equipment, for example, equipment capable of withstanding high pressure and being non-reactive, and with special techniques, they can be made into acceptable phosphors within the purview of the present invention.

The amount of the activator or indium sulfide, $In_2S_3$, added to the metallic halide, or which should be present in the crystal lattice, need only be that amount required to provide fluorescence. Amounts even as low as 0.5% by weight have been remarkably effective in producing fluorescence. Large amounts are not used as such appreciably change the color and/or decrease the intensity of the emitted light and, if excessive, may be detrimental in that no fluorescence will occur. Hence, only a minor amount need be present. However, for good results from a commercial standpoint it is necessary to use from 1.5 to 10 per cent by weight of the indium sulfide in the metallic halide. For the best results under most conditions, it is preferred to use from 4.5 to 6.0 per cent by weight of the indium sulfide. It, thus, is seen that while the quantity of activator is not too critical it must always be present in an amount sufficient to enter the crystal lattice of the metallic halide to provide the necessary fluorescent or impurity centers.

Indium sulfide can be prepared by a number of methods as shown by Fig. 1. One method comprises vacuum evaporating indium onto ceramic bases, such as porcelain squares, which are subsequently exposed to $H_2S$ gas for one hour while being heated at 700° C. in an enclosed furnace to provide an indium sulfide film which can then be removed from the ceramic base, pulverized, and mixed with the other constituents. Another method comprises pouring molten indium on the ceramic base which is then heated to from 200 to 230° C. for three hours in a $H_2S$ atmosphere. Still another method is to combine indium and sulfur directly by pulverizing and mixing the elements together and firing in an $H_2S$ atmosphere at red heat wherein the elements combine with incandescence followed by a second pulverizing, mixing, and firing in $H_2S$ at from 200 to 370° C. for from two to three hours. The second series of operations can be repeated, if desired, to obtain complete conversion of the indium and sulfur into indium sulfide. The best method is to prepare $In_2S_3$ by chemical methods which increases the purity of the indium compound. In this method, indium is dissolved in nitric acid and the solution boiled until $In(NO_3)_3$ crystallizes out. The nitrate is then fired in air until $In_2O_3$ is formed. The oxide can next be dissolved in HCl to insure that the indium ions are in a valence state of plus three. The pH of the solution is adjusted to from 1 to 1.5, and kept constant, while $In_2S_3$ is precipitated by passing $H_2S$ through the solution. After washing the precipitate thoroughly, it is dried in a vacuum oven at 200° C. Before drying, the precipitate is usually yellow, but it can be changed to the typical orange color of amorphous $In_2S_3$ by drying. The amorphous material still contains about 3 per cent moisture but this is not critical. Less pure $In_2S_3$ can be obtained by dissolving commercially made $InCl_3$, $In_2(SO_4)_3$, or $In(NO_3)_3$ in the proper amount of water, correcting the pH as discussed above and then passing $H_2S$ gas through the solution followed by the usual filtering, etc., steps.

While the metallic halide-indium sulfide activated phosphor of this invention is eminently useful in its own right, it is very often desirable to change its color and/or increase the intensity of this color emission. To achieve this purpose a metallic base color and intensification additive is readily added to the phosphor compound, usually at the time the halide is activated with indium sulfide. This color additive which should be capable of entering matrix lattice and changing the color and intensity is added in only very minor amounts, substantially less than the amount of the indium sulfide activator employed. Only that amount of additive need be added to change the color of the emission and to increase the brightness or intensity of the light emitted. For most purposes it has been found that from 0.0001 to 0.1 per cent by weight of the coloring agent in the crystal lattice of, or added to, the metallic halide will provide the necessary change in color and increased intensification of the phosphor emission. It, however, is preferred to use in the phosphor from 0.001 to 0.008 per cent by weight of the additive. It has been found that an additive such as a metal selected from the group consisting of copper, gold, lead, lithium, manganese, silver, tin, zinc, and the rare earth metals (lanthanum, cerium, praseodymium, neodymium, samarium, europium, gadolinium, terbium, dysprosium, holmium, erbium, thulium, neo-ytterbium, lutecium, celtium, scandium, and yttrium) will provide the desired results. Moreover, the halide, nitrate, nitride, oxide, sulfate and sulfide salts of these coloring and intensifying metal additives can likewise be employed with equivalent results, with appropriate changes in the amounts used although it will be understood that the amounts used will be based on the metal content as set forth above. These metals and their salts can be used singly or in mixtures of one or more in the total amounts as set forth above. The halide, nitrate, nitride, sulfate or sulfide atoms or radicals from the metallic color additive salt are very likely also in the resulting phosphor matrix and aid in the color or intensification of the phosphor matrix rather than being present as adventitious materials, although this has not been definitely proven. It will be noted that $In_2S_3$ is not an equivalent of the color or intensification additives, for if the quantities are reversed, or otherwise changed, no fluorescence will occur. Thus, the color and intensification additives can not be substituted partially or entirely for the indium sulfide, nor vice versa.

In preparing the phosphor itself, as shown in Fig. 1, first the metallic halide base or matrix material is heated in an inert or nonreactive crucible in air above its melting point, for example, from 20 to 30° C. above its melting point, for a short period of time, about 5 to 10 minutes, to eliminate moisture, and then allowed to cool and is pulverized. It is then mixed with the required amount of indium sulfide, and also with the color additive when desired, and again heated in air not substantially above the melting point of the mixture, that is from about 5 to about 25° C. above the melting point, for another short period of time— from 1 to 3 minutes—to cause the indium sulfide and color additive to enter or fuse in the lattice of the matrix material. In both heating steps the time should only be that required to obtain the desired result. Long heats at elevated temperatures are to be avoided as dissociation of the halide matrix as well as oxidation may occur at the elevated temperatures. However, due to the short time and small area of bulk of melt, no appreciable oxidation occurs. It, thus, is seen that the mixture need be heated only to a temperature and for a period of time sufficient to cause the matrix material to melt and the indium sulfide and additive to enter its lattice. While the melting point of the metallic halides used as matrices will vary from about 568 to about 962° C., the indium sulfide activator and color and intensification additive within the amounts deemed sufficient to provide necessary fluorescence, intensity, etc., will cause the melting point of the matrix to drop about 10 to about 200° C. Thus, the melting of the components provides a homogeneous melt with the activator and additive thoroughly dispersed or mixed from an atomic or molecular standpoint with the halide matrix. On cooling, the activator and additive are fused within the crystal lattice of the metallic halide matrix. After cooling, the phosphor can be pulverized to a convenient, useful size, usually not smaller than about 325 mesh will be sufficient. The pulverization step should not be allowed to continue too long or at a high speed in order to avoid heating which may change the crystal and its fluorescent properties. Furthermore, pulverization to too small sizes will destroy the crystal and thus fluorescence will be lost. The resulting pulverized phosphor can then be directly spread on a plate or other surface to make a coating which will respond to various types of radiation. It, however, is more practical to disperse it in a binder or other adhesive composition and spray it to form an adherent coating, as will be more fully discussed below.

The adhesive or binder material should adhere strongly to the base plate on evaporation of the solvent as well as provide a dispersing medium for the phosphor particles which will be retained by it. The binder should also be inert with respect to the phosphor, and, when used in cathode ray tubes or other articles through which light should pass, etc., should also be translucent or transparent. Moreover, the binder should not fluoresce so as to mask the effect of the phosphor. The binder should also readily decompose or burn off at relatively low temperatures, i. e., about 150° C. Furthermore, the binder should not decompose nor break down during mixing or after spraying so that its properties are changed. The particle size of the binder material is not too critical. It can be placed in the milling or mixing machinery in the size and form as commercially furnished, for it will be reduced to a very small particle size during mixing and grinding and further will dissolve in the solvent.

Satisfactory binder materials for the practice of this invention are polystyrene, silicone, acrylic acid esters, and vinylite polymers or resins. An example of such binders is Vinylite VYHH which is a vinyl chloride-vinyl acetate copolymer. Its approximate chemical composition is 87 per cent vinyl chloride and 13 per cent vinyl acetate. It has an intrinsic viscosity measured in cyclo-hexanone at 20° C. of 0.53. Another resin is Vinylite VMCH which is a vinyl chloride-vinyl acetate copolymeric resin which is modified with 1 per cent of an interpolymerized dibasic acid (0.7 to 0.8 carboxyl). The composition of this resin is approximately 86 per cent vinyl chloride, 13 per cent vinyl acetate, and 1 per cent dibasic acid. It has an intrinsic viscosity (cyclo-hexanone at 20° C.) of 0.53. Still another resin is Acryloid A-10 which is a polymerized ester derivative of acrylic and alpha methyl acrylic acids. This product is supplied as a 30 per cent solids solution in Cellosolve acetate, and has a specific gravity of 1.03, a refractive index of 1.428, and a Gardner-Holdt viscosity of U-W. Acryloid B-72 is a polymerized ester derivative of acrylic and alpha methyl acrylic acids. It is supplied as a 40 per cent solution in toluol, and has a specific gravity of 0.97, a refractive index of 1.489, and a Gardner-Holdt viscosity of S-W. Another binder, Silicone DC 804, is a silicone resin, and is supplied as a 60 per cent solids solution in aromatic naphthas and coal tar hydrocarbons (e. g. toluol, xylol, etc.). It is a straw-colored solution with a specific gravity of 1.06 and viscosity of 0.3 to 1.0 centipoise at 25° C. Polystyrene is a thermoplastic resin made by polymerizing styrene. Parlon (chlorinated rubber) can also be effectively employed as a binder. In general, this product contains from 66 to 68 per cent chlorine which corresponds approximately to the chemical formula $(C_{10}H_{13}Cl_7)_x$. However, the incorporation of a small amount of a plasticizing material with it, such as rezyl 869, will improve its adhesion and flexibility. Rezyl 869 is an alkyd resin containing approximately 60 per cent linseed oil and 40 per cent glycerol phthalate. This resin has an acid number of 2-6, contains a minimum of 27 per cent phthalic anhydride, and is supplied at 100 per cent solids. For the purposes of this invention parlon containing rezyl will be considered as one binder.

Moreover, other suitable materials for forming binder compositions are Amberol resins (oil soluble, solid phenol-formaldehyde and/or maleic-glyceride resins, usually rosin modified, having a specific gravity of from 1.09 to 1.11 and a melting point of from 121 to 160° C.), staybelite esters (mono-, di- and tri-ethylene glycol and glyceryl esters of hydrogenated rosin), polyethylene resins, Pliofilm (rubber chloride), polyvinyl chloride resins, polyvinyl acetate resins, and alkyd resins (reaction product of mono-, di- and tri-basic acids with polyhydric alcohols and containing a drying or non-drying fatty acid oil as an internal plasticizer). These and the foregoing resin materials can be used singly or mixed together.

It is obvious that still other materials which form adherent layers on base or basic materials as well as with the phosphor, do not plasticize in the presence of the phosphor nor adversely affect it, and readily burn or decompose, or are subject to dissolution, at low temperatures can be employed in the composition.

The solvent used with the binder should be a substantially pure, low boiling point hydrocarbon solvent, and like the binder should not introduce impurities into the phosphor. The solvent should preferably be one that is suitable for the particular binder employed, and it should not react with the binder material to form a polymerized product or similar substances which cannot be sprayed. Furthermore, the solvent should not affect the adhesiveness of the binder. Part of the solvent may be added to the phosphor and binder in the mill to provide good grinding viscosity and the balance added after milling to increase the fluidity of the resulting mixture. The total amount of the solvent used is from ½ to 5 parts by volume of the solvent to 1 part by volume of the binder which has resulted in readily sprayable organic binder-solvent compositions or solutions. It is preferred, however, to use from 0.8 to 1.4 parts by volume of solvent to 1 part by volume of binder in the organic binder composition. It is obvious to those skilled in the art that, where less solvent is present, it will be necessary to warm the composition slightly or increase the pressure in order to spray it. The temperature of the composition should not exceed 50° C. however, in order to prevent excessive evaporation of solvent before spraying and formation of a rippled surface on the base when sprayed.

Examples of suitable solvents for use with the binders disclosed herein are pentane, toluene, Cellosolve acetate, xylene, gasoline, petroleum naphtha, Amsco F, benzene, trichloroethylene, methyl isobutyl ketone or mixtures thereof. Cellosolve acetate is an organic chemical whose formula is $C_2H_5OCH_2CH_2OOCCH_3$. Amsco F is an aromatic petroleum solvent with the following approximate characteristics: specific gravity (60° F.) 0.8628, 77 per cent aromatics, refractive index of 1.4905, mixed aniline point of 86° F., flash point 130° F., and Kouri Boutanol value of 70.

The amount of the indium-sulfide activated phosphor used in the sprayed composition is generally related to the quality of the resulting picture or amount of fluorescence desired. A large excess of binder material with respect to the phosphor will naturally result in less phosphor particles per unit area of the coating and, therefore, a grainy picture or a light having less intensity will result. On the other hand, there should always be sufficient binder present to effectively hold the dispersed phosphor particles in the coating and/or to the base layer or material. Compositions containing one part by volume of the indium-activated phosphor with or without the color additive to 0.1 to 15 parts by volume of binder have produced good phosphor coatings or paint films on bases. To obtain the best fluorescence under all conditions, it has been found most desirable to prepare a composition containing one volume of indium-activated phosphor to from 0.2 to 0.5 part by volume of binder. Hence, in such cases the following ratios including the solvent will provide satisfactory sprayable compositions:

1. Acceptable compositions: one volume phosphor+from 0.1 to 15 volumes binder+0.05 to 75 volumes solvent (or from ½ to 5 volumes solvent for each volume binder).

2. Best or preferred compositions: one volume phosphor+from 0.2 to 0.5 volume binder+0.16 to 0.7 volume solvent (or from 0.8 to 1.4 volumes solvent for each volume binder).

It is unnecessary to add the phosphor to the binder in the mill or mixing machinery in the form of finely divided particles, but the phosphor can be added in the form of chunks, grains or pellets. The phosphor, binder and solvent should be thoroughly mixed and ground up so that the phosphor is reduced in size and thoroughly dispersed throughout the binder or binder and solvent, and no surface irregularities, masses of unmixed particles, etc., appear in the final coating on low magnification. It is preferred to mix and grind, or mill, until the particles in the composition have a size not smaller than about 325 mesh, although compositions having particles up to about .0002 inch in size have proven satisfactory. Instead of adding the phosphor in pellet or pulverized form to the mill followed by the separate additions of binder and solvent, it, of course, is obvious that a solution of the binder in the solvent can be added to the phosphor in the mill. It is only necessary that enough solvent be present during milling to give good grinding viscosity. The phosphor can also be pulverized first, and milling replaced by simple mixing.

Any commercially available mixing and grinding machinery can be utilized for this procedure, although it is desirable to use a ball mill at room temperature. The mill usually is not heated nor cooled, although the temperature during milling should not be allowed to rise appreciably to prevent changes in the nature of the phosphor crystal lattice. Ceramic, glass or steel balls can be used in this mill. Steel balls, however, have been found best as they produce a better mixing and grinding action. The time of mixing is not critical, although it has been found preferable to mix until the particles have been reduced to not smaller than about 325 mesh size. The equipment should also be thoroughly cleaned before mixing to prevent the introduction of any impurities which might adversely affect the resulting phosphor composition.

At the end of the milling period additional solvent can then be added to the mixture and the mill operated for a short time. This insures sufficient fluidity so that the composition can be readily sprayed and provides a complete dispersion of particles in the solvent carrier or a homogeneous-appearing solution or mixture. More than 90 per cent recovery of materials is thereby effected. While actually the mixture at the end of the milling period contains a dispersion of phosphor particles in the binder and can be used to coat plates to provide a fluorescent layer thereon, it is apparent that additional solvent may be indicated as a means to facilitate spraying or coating the base material.

Commercially available paint-spraying equipment can be used to spray the composition onto the bases which are customarily at room temperature, Figs. 2 and 3. It should be thoroughly cleaned prior to use to prevent the introduction of harmful impurities into the mixture. It should also provide means for heating the composition when it is not sufficiently fluid. The equipment furthermore should be flexible and be provided with adjusting means to enable the operator to readily produce on the base material coatings having thicknesses of from .0003 to .002 inch. Thicker coatings, of course, can be applied by longer spraying, but thicker coatings are wasteful of material and may increase the time necessary to remove the binder when making cathode ray tubes. If the coating is too thin, pinholes are apt to occur so that a continuous film is not produced. Thus, coatings as thin as .0003 inch represent about the practical limit for spraying. Other methods besides spraying can be utilized to produce thin coatings of this composition on the base plate. For example, the composition could be applied by means of a brush or a draw blade, or by dipping or roller-coating.

Moreover, it is not necessary to spray the phosphor-binder mixture, but one can first make or prepare the binder composition and spray it onto the base, Fig. 4. While the binder is still in a tacky condition or in a semifluid state before evaporation of the solvent, the phosphor of this invention is easily dusted, sprinkled, or sprayed onto the adhesive layer to make a phosphor coating.

At the end of the coating step, the base containing the phosphor composition is allowed to air-dry or it is placed in an oven and warmed in order to hasten the evaporation of the solvent.

Further, the resin and phosphor can be mixed in a dry state, chilled, pulverized, dusted or electrostatically applied to a base which is then heated to a low temperature and cooled to cause the binder to slightly flow and set, thereby providing an adherent coating.

The base or basis material or plate used in this process should be at room temperature and at least not above about 50° C., when being sprayed with the phosphor composition, in order to prevent too rapid evaporation of solvent and to prevent ripples forming in the film. The base material plate can be of any desired shape. The surface of the plate should be cleaned before coating with the phosphor composition in order to remove grease and other dirt which might prevent firm adherence of the coating to the base. This can be accomplished by washing the base with any suitable alkali cleaner, or with a hydrocarbon solvent, followed by rinsing. Any gross surface irregularities should be removed by grinding or polishing, although it is not necessary to polish the base until it has mirror-like reflectivity. The base can also be formed into the desired object or shape before being sprayed such as into a cathode ray or television tube, or fluorescent tube, etc. Where intended for use in fluorescent or cathode ray tubes, the base should be somewhat transparent. Acceptable materials for the base have been found to be aluminum, brass, glass, aluminum-coated glass, stainless steel, nickel, steel, bronze, copper, engraver's copper, engraver's zinc, grained lithographic zinc, plastics like Lucite and cellophane, wood, leather, and paper. It is obvious to those skilled in the art that other materials similar to the aforementioned can also be used as bases for the composition in order to make luminescent signs, luminescent screens such as cathode ray screens and television tubes, luminescent designs, coatings and films, and scintillation counters, etc.

When the phosphor of the present invention is to be used in cathode ray or similar tubes, a large portion of the binder must necessarily be removed so that the light given off by the phosphor can readily be seen. This can be achieved easily by contacting the phosphor coating with air at a temperature of approximately 150° C. for from 1 to 5 hours or more. The temperature must not be allowed to appreciably exceed 150° C. in order to prevent the phosphor from fusing, oxidizing, or producing changes in its crystal structure so that it will not fluoresce. Thus, using low temperatures for long periods of time is required to remove the binder without oxidizing the phosphor or changing its crystal configuration due to thin layer and large area exposed. At the end of the heat-treatment step, the phosphor particles will be bound to the base by a thin layer of binder, said binder being largely discontinuous, with the phosphor particles forming a plurality of closely adjacent discrete areas thereon, Figs. 5 and 6a and b.

The phosphor of this invention can be caused to fluoresce by means of protons, alpha particles, electrons, X-rays, gamma rays, and ultraviolet rays, Fig. 7. The apparatus producing such radiation can be placed at any convenient distance from the surface of the phosphor as is obvious to those skilled in the art.

It, of course, is realized that the compositions of the present invention may contain incidental impurities which do not adversely affect the results. However, while it is not essential, it is naturally desirable to use substantially pure materials in order to obtain consistently good results since introduction of appreciable amounts of other impurities may adversely affect the fluorescence of the phosphor as well as its adherence to the binder, etc. It, thus, is preferred to employ the chemically pure, or "C. P." grade of chemicals, whenever possible when practicing the present invention.

The following examples will serve to illustrate the invention with more particularity to those skilled in the art and also enable them to more readily practice the same:

*Example I*

15 grams of cadmium chloride, $CdCl_2$, were heated in a glazed porcelain crucible to a temperature approximately 25° C. above its melting point in air for 20 minutes. On cooling, the chloride was ground into fine powder and mixed thoroughly with 1 gram of indium sulfide, $In_2S_3$, which had been previously pulverized. The mixture was then heated in air in a glazed porcelain crucible to about 12° C. above its melting point and held there for 1 minute. On removal from the furnace the material was allowed to cool to room temperature in air and again pulverized. The indium sulfide activated phosphor was then mixed with a previously prepared binder composition containing 10 grams of acryloid B-72 in 30 grams of toluene. Part of the phosphor-binder composition was then sprayed onto a flat glass plate and the other part was sprayed onto the inner glass face of a cathode ray tube. The part sprayed onto the plate was allowed to air-dry and then exposed to ultraviolet radiation, whereupon it emitted an orange fluorescence. The cathode tube was dried in an oven at 100° and then air at a temperature of 150° was passed over its coated surface for about an hour and a half to decompose and remove all of the binder except for that part lying between the phosphor and the glass face. This burning or distillation removed sufficient binder to thereby render the glass substantially transparent to light from the phosphor when it was excited. The tube was then evacuated and sealed and the coating was exposed to electron bombardment which gave an orange-yellow fluorescence.

*Example II*

A color and intensification additive was added to a number of other compositions prepared in the same manner as Example I, the additive being added to the mix and heated with the $In_2S_3$. However, the binder-solvent composition was omitted from these samples. The change in intensity resulting therefrom is shown by Fig. 8, noted previously, where the amounts of indium sulfide and cadmium chloride were fixed at 1 gram and 20 grams, respectively, and the color additive added in amounts of 0.05, 0.005, and 0.0005 per cent by weight Cu as CuS.

*Example III*

Phosphors were also produced by the method of Example I using 1 g. $In_2S_3$ plus 20 g. $CdCl_2$ and plus 0.001 g. (as the metal) of the color additive and intensifier. Ag, Au, Cu, Mn, and Zn sulfides were used as the additives. One specimen, to be used for comparison, was produced with no color additive. All the specimens, except that with a Mn sulfide additive, were analyzed on a spectrophotometer, by placing a sample of the powdered phosphor on the base. As seen in Fig. 9, spectral distribution for emission spectrum of $Ag_2S$ and CuS additives are the most intense, with $Ag_2S$ yielding a yellow color and CuS yielding an orange color. The spectral distribution of emission is similar, with $Ag_2S$ shifting the entire curve toward shorter wavelengths. ZnS yields a phosphor with a color slightly more yellow than CuS, but about .75 per cent as intense. Phosphors with $Au_2S$ as a color additive and intensifier are quite red in color, with the same intensity as those with ZnS. The phosphor with no additive is the same color as that with a Cu additive, but only half as intense. MnS as an additive was tested by X-rays and yields results very similar to Au. No binder or solvent was used with these compositions.

*Example IV*

Still other compositions were prepared according to method of Example I in which the $CdCl_2$ was varied from 15 to 30 grams, the $In_2S_3$ was fixed at 1 gram and the metallic base color and intensification additive, Cu as CuS, was fixed at 0.1% by weight. The variation in intensity of the resulting compounds is shown in Fig. 10.

*Example V*

Several of the above $CdCl_2$-$In_2S_3$ phosphors were bombarded with electrons in the electron-diffraction apparatus. The colors shown were yellow for silver as a color and intensification additive, orange-yellow for zinc and copper additives, and red-orange for a gold additive. No binder or solvent was used with these compositions.

*Example VI*

A phosphor was prepared according to Example I, except that cadmium bromide was used in place of cadmium chloride. Samples contained 10, 20, and 50 grams of $CdBr_2$, 1 gram $In_2S_3$ and 0.001 gram of Cu as CuS. Under ultraviolet light the phosphor appeared red. A spectrographic analysis showed acceptable but less intense radiation for these phosphors than for the $CdCl_2$ base phosphors.

*Example VII*

A phosphor was prepared according to the method of Example I utilizing 20 g. $CdCl_2$, 1 g. $In_2S_3$, 0.001 g. Ag as $Ag_2S$ and 0.001 g. Au as $Au_2S$. The wavelength in Angstroms varied from 4000 to 7200 and the greatest intensity was in the orange-yellow region under ultraviolet rays and electron bombardment.

*Example VIII*

A phosphor was prepared according to the method of Example I utilizing 20 g. $CdCl_2$, 1 g. $In_2S_3$, and 0.001 g. Ce added as $Ce_2O_3$. The wavelength in Angstroms varied from 5000 to 6700 Å. and the greatest intensity was in the yellow region under ultraviolet rays and electron bombardment.

*Example IX*

A phosphor was prepared according to the method of Example I using 20 g. $CdCl_2$, 1 g. $In_2S_3$ and 0.0001 g. Nd as $Nd_2O_3$. The phosphor emitted a yellowish fluorescence under ultraviolet rays and electron bombardment.

The above examples and the figures show that phosphors of the present invention have very high emission intensity in the yellow to red region of the spectrum. Furthermore, the width of the emission band obtainable at about half peak intensity is unusually high—about 2000 Å., while the total emission possible is from 5000 to 7300 Å. where the visible range can extend from 4000 to 7200 Å., which renders these phosphors eminently useful. The phosphors of the present invention also have short persistence which together with the large amount of red-orange-yellow emission makes them ideally suitable for color television tubes. The nice reds obtainable again emphasize the desirability of the composition for use in paints. A further point is that the phosphors may very easily be prepared by heating in air for a short time, the indium sulfide readily entering the halide crystal lattice, and long heats in inert or nonoxidizing atmospheres, quenches, etc., special equipment and techniques being unnecessary.

It is not precisely known why cadmium chloride and the other halides will fluoresce when treated with indium sulfide but is is believed that the mechanism for fluorescence is due to an electron transition from the activator atom to the conduction band in either a one- or two-step process. In a one-step process, it goes directly into the conduction band; in a two-step process, it is excited to a metastable energy level or trap below the conduction band from which it is excited to the conduction band by thermal energies. On returning from the conduction band, it will fall to an excited state of the activator atom and the transition from the excited state to the ground state of the activator atom results in photon emission.

Thus, the fundamental absorption of cadmium chloride corresponds to an electronic transition from the upper occupied Cl $^{minus\ 1}$ band to the lower unoccupied Cd $^{plus\ 2}$ band and the fundamental fluorescence corresponds to the reverse process. This is the situation for cadmium chloride activated with indium sulfide. The orange fluorescence caused by levels introduced by the activator material is due to a transition between the conduction band and these levels. A band structure diagram of this process is shown in Fig. 11a and b. The fundamental flourescence disappears in cadmium chloride when the orange centers are present. This is due to the fact that when orange centers are present, holes may be trapped in the levels of the orange centers and recombination of free electrons with these holes gives rise to the orange fluorescence. A fraction of the recombinations may still give rise to the fundamental fluorescence, but the wavelength region of the fundamental fluorescence band coincides with that covered by the absorption band of the orange centers so that it will be reabsorbed in the orange centers and will thereby give rise to orange fluorescence.

In summary, it is seen that this invention teaches that a new and novel phosphor compound can be readily obtained by treating a metallic halide with indium sulfide to cause the indium sulfide to enter the crystal lattice of the metallic halide and act as an activator. Moreover, the intensity and the color of the phosphor can readily be changed by the addition of a coloring and intensifying additive to the phosphor. This new and novel phosphor has been achieved by combining or reacting materials indium sulfide, a metallic halide, and a color and intensification additive, which in their own right are not conceived as being phosphors. Not only does the new phosphor disclosed herein emit a colored light which makes it especially suitable for use in colored television processes, but it can also be excited by many other types of radiation such as ultraviolet, X-ray, protons, alpha particles, etc. Moreover, this new and novel indium sulfide activated phosphor material can readily be incorporated in a binder and easily sprayed onto various articles to provide coatings which will fluoresce under the proper radiation conditions. Among articles which can be easily made with the phosphor compound of this invention are cathode ray tubes, scintillation counters, fluorescent screens, etc. It, thus, is seen that a new and novel phosphor has been invented which materially advances the art.

This application is a copending application of Middleton, Reynolds and Peet entitled "Indium Base Compound," Serial No. 242,564, filed August 18, 1951.

Having thus described the invention what is claimed as new and novel and what is desired to be secured by Letters Patent is:

1. A phosphor composition comprising from 1.5 to 10 per cent by weight of indium sulfide and the balance essentially a metallic halide selected from the group consisting of barium bromide, barium chloride, barium fluoride, cadmium bromide, cadmium chloride, cadmium fluoride, potassium bromide, potassium chloride, potassium fluoride, sodium bromide, sodium chloride, sodium fluoride, strontium bromide, strontium chloride, and strontium fluoride, said metallic halide having been melted in contact with said indium sulfide, and said indium sulfide having entered the crystal lattice of said metallic halide.

2. A phosphor composition comprising from 1.5 to 10 per cent by weight of indium sulfide, a metallic base color and intensification additive selected from the group consisting of copper, gold, lead, lithium, manganese, silver, tin, zinc, and the rare earth metals and their halide, nitride, oxide, nitrate, sulfide and sulfate salts, in an amount of from 0.0001 to 0.1 per cent by weight based on the metal, and the balance essentially a metallic halide selected from the group consisting of barium bromide, barium chloride, barium fluoride, cadmium bromide, cadmium chloride, cadmium fluoride, potassium bromide, potassium chloride, potassium fluoride, sodium bromide, sodium chloride, sodium fluoride, strontium bromide, strontium chloride, and strontium fluoride, said metallic halide having been melted in contact with said indium sulfide and said additive, and said indium sulfide having entered the crystal lattice of said metallic halide.

3. A phosphor composition comprising from 4.5 to 6.0 per cent by weight of indium sulfide and the balance essentially a metallic halide selected from the group consisting of barium bromide, barium chloride, barium fluoride, cadmium bromide, cadmium chloride, cadmium fluoride, potassium bromide, potassium chloride, potassium fluoride, sodium bromide, sodium chloride, sodium fluoride, strontium bromide, strontium chloride, and strontium fluoride, said metallic halide having been melted in contact with said indium sulfide, and said indium sulfide having entered the crystal lattice of said metallic halide.

4. A phosphor composition comprising from 4.5 to 6.0% by weight of indium sulfide, a metallic base color and intensification additive selected from the group consisting of copper, gold, lead, lithium, manganese, silver, tin, zinc and the rare earth metals and their halide, nitride, oxide, nitrate, sulfide and sulfate salts in an amount of from 0.001 to 0.008 per cent by weight based on the metal, and the balance essentially a metallic halide selected from the group consisting of barium bromide, barium chloride, barium fluoride, cadmium bromide, cadmium chloride, cadmium fluoride, potassium bromide, potassium chloride, potassium fluoride, sodium bromide, sodium chloride, sodium fluoride, strontium bromide, strontium chloride, and strontium fluoride, said metallic halide having been melted in contact with said indium sulfide and said additive, and said indium sulfide having entered the crystal lattice of said metallic halide.

5. A phosphor composition according to claim 1 containing additionally from 0.1 to 15 volumes of an organic binder and from 0.05 to 75 volumes of an organic solvent to 1 volume of said phosphor.

6. A phosphor composition according to claim 2 containing additionally from 0.1 to 15 volumes of an organic binder and from 0.05 to 75 volumes of an organic solvent to 1 volume of said phosphor.

7. A phosphor composition according to claim 3 containing additionally from 0.2 to 0.5 volume of an organic binder and from 0.16 to 0.7 volume of an organic solvent to 1 volume of said phosphor.

8. A phosphor composition according to claim 4 containing additionally from 0.2 to 0.5 volume of an organic binder and from 0.16 to 0.7 volume of an organic solvent to 1 volume of said phosphor.

9. In the method of producing fluorescent materials, the steps comprising treating a major amount of a metallic halide selected from the group consisting of barium bromide, barium chloride, barium fluoride, cadmium bromide, cadmium chloride, cadmium fluoride, potassium bromide, potassium chloride, potassium fluoride, sodium bromide, sodium chloride, sodium fluoride, strontium bromide, strontium chloride, and strontium fluoride, with a minor amount, from about 1.5% to about 10%, of indium sulfide in air at a temperature and for a period of time sufficient to cause said sulfide to enter the crystal lattice of said halide to provide fluorescent centers therein.

10. In the method of producing phosphors, the steps comprising treating a mixture of a major amount of a metallic halide selected from the group consisting of barium bromide, barium chloride, barium fluoride, cadmium bromide, cadmium chloride, cadmium fluoride, potassium bromide, potassium chloride, potassium fluoride, sodium bromide, sodium chloride, sodium fluoride, strontium bromide, strontium chloride, and strontium fluoride, with a minor amount, from about 1.5% to about 10%, of indium sulfide and an amount of a metallic base color and intensification additive, substantially less than said sulfide, from about 0.0001% to about 0.1%, in air at a temperature and for a period of time sufficient to cause said mixture to melt and the materials to become dispersed without dissociation of the halide and then cooling said melt to form crystals wherein said sulfide and said additive have entered the crystal lattice of said halide to provide colored fluorescent centers therein.

11. In the method of producing indium sulfide activated phosphors, the steps comprising mixing together from 1.5 to 10 per cent by weight of indium sulfide, a metallic base color and intensification agent selected from the group consisting of copper, gold, lead, lithium, manganese, silver, tin, zinc, and the rare earth metals and their halide, oxide, nitride, nitrate, sulfide, and sulfate salts in an amount of from 0.0001 to 0.1 per cent based on the metal, and the balance a metallic halide base selected from the group consisting of barium bromide, barium chloride, barium fluoride, cadmium bromide, cadmium chloride, cadmium fluoride, potassium bromide, potassium chloride, potassium fluoride, sodium bromide, sodium chloride, sodium fluoride, strontium bromide, strontium chloride, and strontium fluoride, heating the mixture in air at a temperature and for a period of time sufficient to cause said mixture to melt and the activator and color and intensification additive to mix with said base and cooling said mix to form a crystalline mass wherein said indium sulfide and additive are fused in the crystal lattice of said halide.

12. In the method of producing fluorescent materials according to claim 9, the additional steps including pulverizing and dispersing the resulting phosphor in an organic binder-solvent composition and spraying it onto a basis material.

13. In the method of producing fluorescent materials according to claim 9, the additional steps of pulverizing said phosphor and then applying it in finely divided form to a surface having a coating of a binder-solvent composition thereon.

14. In the method of producing fluorescent materials according to claim 9, the additional steps of pulverizing and dispersing the resulting phosphor in an organic binder solution, spraying the resulting composition onto a base plate, allowing said coated plate to dry, and finally treating said plate with heated air to remove substantially all of said binder leaving said phosphor as a plurality of discreet particles secured to said base by the remaining discontinuous film of said binder.

15. In the method of producing phosphors according to claim 9, the additional step of pulverizing and mixing the resulting phosphor in an organic binder, reducing the resulting mixture to a finely divided state, dusting said finely divided mixture on a basis material, and finally heating and cooling said dusted mixture to cause it to flow and adhere to said basis material thereby providing a phosphor coating.

16. An article of manufacture comprising a base and a fluorescent coating thereon, said coating including a phosphor composition consisting essentially of a predominant amount of a metallic halide selected from the group consisting of barium bromide, barium chloride, barium fluoride, cadmium bromide, cadmium chloride, cadmium fluoride, potassium bromide, potassium chloride, potassium fluoride, sodium bromide, sodium chloride, sodium fluoride, strontium bromide, strontium chloride, and strontium fluoride, and melted in its crystal lattice indium sulfide in a minor amount, from about 1.5% to about 10%, sufficient to cause fluorescence of said halide under radiation, said coating constituting a plurality of discrete particles of said phosphor composition secured to said base by a discontinuous layer of an organic binder.

References Cited in the file of this patent

UNITED STATES PATENTS

| Number | Name | Date |
|---|---|---|
| 2,344,081 | Claude | Mar. 14, 1944 |

FOREIGN PATENTS

| Number | Country | Date |
|---|---|---|
| 492,722 | Great Britain | Sept. 26, 1938 |